United States Patent
Rohrig et al.

(10) Patent No.: US 10,697,478 B2
(45) Date of Patent: Jun. 30, 2020

(54) OPERATING UNIT FOR A FLUID-OPERATED DIAPHRAGM ACTUATOR AND METHOD FOR THE PRODUCTION THEREOF AND DIAPHRAGM ACTUATOR EQUIPPED THEREWITH

(71) Applicant: Festo SE & Co. KG, Esslingen (DE)

(72) Inventors: Harald Rohrig, Spiesen-Elversberg (DE); Andreas Weisang, Gersheim (DE)

(73) Assignee: FESTO SE & Co. KG, Esslingen (DE)

( * ) Notice: Subject to any disclaimer, the term of this patent is extended or adjusted under 35 U.S.C. 154(b) by 0 days.

(21) Appl. No.: 16/315,451

(22) PCT Filed: May 30, 2017

(86) PCT No.: PCT/EP2017/062968
§ 371 (c)(1),
(2) Date: Jan. 4, 2019

(87) PCT Pub. No.: WO2018/010886
PCT Pub. Date: Jan. 18, 2018

(65) Prior Publication Data
US 2019/0234433 A1    Aug. 1, 2019

(30) Foreign Application Priority Data

Jul. 11, 2016   (DE) .................. 10 2016 212 548

(51) Int. Cl.
*F16J 3/02*   (2006.01)
*F15B 15/10*   (2006.01)
*F16K 31/126*   (2006.01)

(52) U.S. Cl.
CPC ................. *F15B 15/10* (2013.01); *F16J 3/02* (2013.01); *F16K 31/1262* (2013.01)

(58) Field of Classification Search
CPC ........ F15B 15/10; F16J 3/02; Y10T 29/49877
See application file for complete search history.

(56) References Cited

U.S. PATENT DOCUMENTS

| 1,999,285 A | * | 4/1935 | Davis .................. F16J 3/02 92/100 |
| 4,178,666 A | * | 12/1979 | Ando .................. B23P 15/001 29/454 |
| 4,224,860 A | | 9/1980 | Neighbor et al. |

FOREIGN PATENT DOCUMENTS

| DE | 10211487 | 9/2003 |
| DE | 102013016350 | 1/2015 |
| EP | 2028377 | 2/2009 |
| JP | 11082418 | 3/1999 |

* cited by examiner

*Primary Examiner* — F Daniel Lopez
(74) *Attorney, Agent, or Firm* — Hoffmann & Baron, LLP (57) ABSTRACT

An operating unit for a fluid-operated diaphragm actuator, the unit consisting of a drive diaphragm, two retaining elements flanking the drive diaphragm on opposite sides and an output rod extending through these components. The drive diaphragm is mounted on the output rod by being clamped between the two retaining elements with a predetermined clamping force, wherein each of the two retaining elements is fixed on the output rod by means of a welded connection. A method that is particularly suitable for producing such an operating unit and to a fluid-operated diaphragm actuator equipped with such an operating unit.

15 Claims, 5 Drawing Sheets

OPERATING UNIT FOR A FLUID-OPERATED DIAPHRAGM ACTUATOR AND METHOD FOR THE PRODUCTION THEREOF AND DIAPHRAGM ACTUATOR EQUIPPED THEREWITH

This application claims priority based on an International Application filed under the Patent Cooperation Treaty, PCT/EP2017/062968, filed on May 30, 2017, which claims priority to DE 10 2016 212 548.6 filed on Jul. 11, 2016.

BACKGROUND OF THE INVENTION

The invention relates to an operating unit of a fluid-operated diaphragm actuator, comprising an elastically deformable drive diaphragm having a central through hole, two annular retaining elements flanking the drive diaphragm on axially opposite sides, and an output rod passing through the drive diaphragm and the retaining elements, wherein a central diaphragm mounting section of the drive diaphragm is clamped between the two retaining elements fixed to the output rod.

The invention also relates to a method for production of an operating unit of a fluid-operated diaphragm actuator which has an elastically deformable drive diaphragm with a central through hole, two annular retaining elements flanking the drive diaphragm on axially opposite sides, and an output rod passing through the drive diaphragm and the retaining elements, wherein a central diaphragm mounting section of the drive diaphragm is clamped between the two retaining elements fixed to the output rod.

The invention also relates to a fluid-operated diaphragm actuator with an actuator housing which bounds a housing interior in which is mounted a drive diaphragm separating two axially adjacent working chambers from one another with fluid-tightness and coupled to an output rod for driving purposes, and which is axially deflectable by means of fluidic pressurisation of at least one of the working chambers in order to generate an output movement of the output rod, wherein the drive diaphragm is so fixed to the output rod that it is clamped by a diaphragm mounting section between two annular retaining elements resting on the output rod, wherein the drive diaphragm together with the two retaining elements and the output rod is combined to form an operating unit.

A diaphragm actuator constructed in the manner described above and equipped with a correspondingly produced operating unit is known from EP 2 028 377 A2. The known diaphragm actuator contains an operating unit accommodated in a housing, with a sliding output rod extending from the housing and to which is attached, within the housing, a drive diaphragm dividing from one another two working chambers, one of which may be subjected to fluidic pressurisation in order to move the drive diaphragm and therefore also the output rod fixed to it. Provided for fastening the drive diaphragm to the output rod are two annular retaining elements, between which the drive diaphragm is clamped and which are braced to one another by means of a screw connection.

U.S. Pat. No. 4,224,860 A describes a servomotor with a diaphragm assembly as operating unit. The diaphragm assembly includes a diaphragm clamped by an outer flange between two housing sections and also clamped with sealing between two support elements. One of the support elements passes through the diaphragm and dips with a tubular section into a stepped recess of the other support element. Both support elements are made of plastic material and are fastened to one another by ultrasonic welding, by their sections which dip into one another, at an annular contact line.

Known from DE 10 2013 016 350 B3 is a fluid-operated diaphragm actuator which also includes an operating unit with a drive diaphragm clamped between two retaining elements fastened to an output rod. The retaining elements, together with the drive diaphragm, are fixed to the output rod by means of a mounting bolt screwed into the output rod.

SUMMARY OF THE INVENTION

The invention is based on the problem of finding measures which allow cost-effective realisation of the operating unit of a fluid-operated diaphragm actuator and therefore also of a diaphragm actuator equipped with such an operating unit.

To solve this problem it is provided, in conjunction with an operating unit of the type described above, that the two retaining elements are attached to the output rod at an axial distance from one another generating a predetermined clamping force relative to the drive diaphragm and independently of one another by means of a welded connection in each case.

In connection with a method of the type described above, the problem is solved by providing that the two retaining elements, for their fixing on the output rod, are welded independently of one another to the output rod passing through them, wherein the two retaining elements, in the state in which at least one retaining element is not yet welded to the output rod, are braced to one another axially by the imposition of an external mounting force in such a way that the diaphragm mounting section of the drive diaphragm previously incorporated between the two retaining elements is clamped axially between the retaining elements by a predetermined clamping force, whereupon the at least one retaining element not so far permanently welded, is welded to the output rod while maintaining the external mounting force.

In conjunction with a fluid-operated diaphragm actuator of the type described above, the problem is solved by the design and/or production of its operating unit in the manner described above.

In this way it is possible for the operating unit and a fluid-operated diaphragm actuator equipped with it to be produced cost-effectively and efficiently. The fixing of the retaining elements to the output rod by means of welding provides for a durable and secure bond of the components welded together and permits cost-effective realisation in the context of automated production processes. At a section between the two retaining elements, described as the diaphragm mounting section, the drive diaphragm is clamped and thus held securely between the two retaining elements, so that an axial transmission of force is possible. It is possible to dispense with additional sealing means between the drive diaphragm and the output rod, if the elastic drive diaphragm is firmly clamped between the retaining elements with simultaneous generation of a sealing effect which, besides reliable transmission of the driving force, is accompanied by reliable sealing in the contact area between the drive diaphragm and the two retaining elements. In assembly of the operating unit, the two retaining elements are welded to the output rod in a state in which they are brought so close together, by imposition of a suitably high external mounting force, that the diaphragm mounting section of the drive diaphragm lying between them is pressed between the retaining elements with an adequately high clamping force.

The axial pressing of the drive diaphragm by the retaining elements can occur when both retaining elements are not yet welded to the output rod or after one of the retaining elements has already been welded to the output rod, as shown by the preferred method.

Advantageous developments of the inventions are disclosed in the dependent claims.

Preferably the two retaining elements are welded to the output rod in a relative position set between them which is characterised in that, in the area of the diaphragm mounting section, there is an axial distance between the two retaining elements which is less than the axial thickness of the clamped diaphragm mounting section in its unclamped initial state.

The welded connections between the retaining elements and the output rod are expediently in the form of annular weld seams, concentric to the output rod. Annular, self-contained weld seams also offer, in addition to high strength, the advantage of a sealing function, since they prevent the passage of fluid between the retaining elements and the output rod.

Each of the two welded connections is preferably a laser welded connection. In principle, though, any type of welded connection may be provided, wherein however welded connections made by an energy beam, in which no additional welding material is used, are preferred.

Expediently, the welded connections are made in the area of the end faces of the retaining elements facing axially away from the clamped diaphragm mounting section.

Each of the two annular retaining elements is preferably shaped like an annular disc. They are therefore very flat and do not impair the available deflection movement for the drive diaphragm.

Preferably the annular body of at least one and preferably each annular-disc-shaped retaining element is provided with a U-shaped cross-section. The retaining elements are so aligned that the U-shaped cross-sections of their annular bodies face away from one another. Retaining elements designed in this way facilitate stable radial contact with the outer periphery of the output rod and promote, in operation of a diaphragm actuator equipped with the operating unit, low-wear deformation of the drive diaphragm radially outwards, in the area where the retaining elements end.

The welded connection serving for fixing to the output rod is expediently made in each case at the end face between an inner sleeve-shaped section of the retaining element and the output rod. The inner sleeve-shaped section of the retaining element is formed by that leg of the U-shaped cross-section of the annular body bordering the retaining element on the radial inside in the area of its through hole.

Preferably the retaining element also has an outer sleeve-shaped section which is formed by the outer leg of the U-shaped cross-section of the annular body and is arranged concentric to the inner sleeve-shaped section.

It has proved to be especially expedient to design the diaphragm mounting section clamped between the two retaining elements so that it has an annular inner part mounting section encompassing the central through hole of the drive diaphragm and an annular outer part mounting section, concentrically encompassing the inner part mounting section and with a lesser thickness than the annular inner part mounting section. The annular outer part mounting section is expediently surmounted by the annular inner part mounting section for a short distance on both axial sides, so that the diaphragm mounting section has a concentric step towards the centre of the drive diaphragm. The axial end faces of the annular retaining elements which act axially on the diaphragm mounting section have a shaping which is at least substantially complementary to an annular step, so that the diaphragm mounting section is able to engage with its inner part mounting section in an axially recessed, annular inner end face section of the adjacent retaining element. This results, in the radial direction, in a form-fitting connection between the diaphragm mounting section and the two retaining elements, thereby preventing any undesired pulling-out of the drive diaphragm due to its expansion in the course of operation. This also promotes the axial pressing and the resulting sealing quality.

Both the output rod and also the annular retaining elements are expediently made of metal, in particular of steel, preferably stainless steel. An aluminium version is however also advantageous because of its low weight.

As referred to above, in production of the operating unit it is considered advantageous for one of the two retaining elements to be welded to the output rod before imposition of the external mounting force, with only the second retaining element being welded to the output rod with the external mounting force applied. This promotes the axial positioning of the first-mentioned retaining element on the output rod, which reliably ensures that the assembly formed by the drive diaphragm and the two retaining elements is attached at the desired target position.

A preferred process sequence in production of an operating unit provides that in a first step the one retaining element is pushed on to the output rod up to a desired axial target position and is then welded to the output rod. The drive diaphragm and the other retaining element are then pushed on to the output rod, so that the drive diaphragm is incorporated coaxially between the two retaining elements in the manner of a sandwich assembly. Here the drive diaphragm and the second retaining element may be pushed on to the output rod one after the other, or in a single operation. The two retaining elements are then axially braced to one another, while the diaphragm mounting section lying between them is also clamped, being axially slightly compressed with a reduction in its thickness. The resultant elastic resetting force ensures a continuing fluid-tight surface pressure between the drive diaphragm and the two retaining elements. The pressing-together is achieved through the imposition of an external mounting force, which may be provided by a suitably designed mounting device. Such a mounting device expediently has a suitable force measuring device, so that the predetermined clamping force and the associated axial distance between the two retaining elements may be set in a reliable and reproducible manner. Next, while maintaining the external mounting force, the second retaining element is also welded to the output rod, so that the two retaining elements are welded at an axial distance from one another which ensures the desired clamping force and independent of the other respective retaining element. Following this, the mounting force may be removed, and the operating unit is ready for fitting into the housing of a fluid-operated diaphragm actuator, in order to complete the latter.

Since the two retaining elements are fixed to the output rod solely by a welded connection, very efficient production with a very small number of components is possible.

BRIEF DESCRIPTION OF THE DRAWINGS

The invention is explained in detail below with the aid of the appended drawing, which shows in:

FIG. 3 the operating unit installed in the diaphragm actuator of FIGS. 1 and 2, consisting of an output rod, a drive diaphragm and two retaining elements, in a detail side view, and FIGS. 4-7 various process steps carried out consecutively to produce the operating unit of FIG. 3, wherein FIG. 7 represents a longitudinal section through the finished operating unit, with the output rod however being depicted unsectioned.

DETAILED DESCRIPTION OF THE PREFERRED EMBODIMENTS

Shown in the drawing is a fluid-operated diaphragm actuator generally denoted by reference number 1, which has a longitudinal axis 2 and a housing described below as actuator housing 3, which encompasses a housing interior 4.

Located in the housing interior 4 is a diaphragm, at least partly and preferably entirely elastically deformable, and in particular made of a material with rubber-elastic properties. On account of its function it is described below as the drive diaphragm 5. The drive diaphragm 5 extends at right-angles to the longitudinal axis 2 and has on the radial outside an outer edge section 6 extending around the longitudinal axis 2, to which it is clamped with sealing, fixed to the housing.

The drive diaphragm 5 divides the housing interior 4 into two axially consecutive first and second working chambers 7, 8. Each working chamber 7, 8 is bounded on one side by the drive diaphragm 5 and on the other side by a wall section of the actuator housing 3.

The actuator housing 3 is expediently made in several parts, with two first and second actuator housing sections 12, 13 provided axially adjacent to one another in a joining zone 11 under sealing. Each actuator housing section 12, 13 is expediently and substantially cup-shaped, with the actuator housing sections 12, 13 being so aligned that their openings face one another in the joining zone 11.

Using tensioning means, not shown in detail, the two actuator housing sections 12, 13 are axially braced firmly against one another, wherein at the same time the outer edge section 6 of the drive diaphragm 5 is also clamped. The outer edge section 6 of the drive diaphragm 5 may be clamped directly between the two actuator housing sections 12, 13. The preferred form of construction however involves the insertion in each actuator housing section 12, 13 of an insert element 14, 15, which rests axially on the actuator housing section 12, 13 accommodating it, while the outer edge section 6 of the drive diaphragm 5 is clamped between the two insert elements 14, 15. This applies to the embodiment.

Extending in the axial direction of the longitudinal axis 2, in the housing interior 4, is an output rod 16 which may be moved linearly to and fro in the axial direction of the longitudinal axis 2 relative to the actuator housing 3, executing an output movement 17 indicated by a double arrow.

The output rod 16 has a longitudinal axis 18 which expediently coincides with the longitudinal axis 2 of the diaphragm actuator 1. The output movement 17 runs in the axial direction of the longitudinal axis 18.

The housing interior 4 is bounded on axially opposite sides by a first end wall 22 and a second end wall 23 wherein, by way of example, the first end wall 22 is part of the first actuator housing section 12 and the second end wall 23 is part of the second actuator housing section 13. At least one of the two end walls, 22, 23—in the embodiment this is the second end wall 23—has an axial wall opening 24 through which the output rod 16 extends, preferably sliding and under sealing, wherein there is formed on the output rod 16 an output section 25, accessible from outside the actuator housing 3, which may be connected for drive purposes to an external component, not shown further, which is to be operated.

The external component to be operated involves in particular the valve member of a valve fitting which may be moved by execution of the output movement 17 between a closed position and at least one open position and may be set in different positions. Together with the valve fitting, the diaphragm actuator 1 may represent in particular a so-called process valve, which is used in the processing industry to control liquid or gaseous fluid flows.

In the embodiment, the output rod 16 dips with its rear end section 26 opposite the wall opening 24, similarly sliding into a wall opening 27 of the first end wall 22, so that the output rod 16 is guided and radially supported, altogether secure against tilting and able to move linearly with a high degree of precision relative to the actuator housing 3.

The rear end section of the output rod 16 may if required be assigned a display device 28, allowing visualisation of the current movement position of the output rod 16.

The drive diaphragm 5 has a central central through hole 32 which is encompassed by an annular diaphragm section of the drive diaphragm 5 described as the diaphragm mounting section 33. The output rod 16 passes through the central through hole 32, while the drive diaphragm 5 is fixed, axially immovable, by its diaphragm mounting section 33 to a length section of the output rod 16 described as the rod mounting section 34.

By means of a controlled fluidic pressurisation of the second working chamber 8 of the embodiment, the drive diaphragm 5 may be axially deflected in the area of its diaphragm mounting section 33, executing a drive movement 35 indicated by a double arrow. The diaphragm mounting section 33 may here be deflected between a maximum deflected first end position evident from FIG. 2, and a second end position, not further depicted, with maximum deflection in this respect in the opposite direction. In the course of the drive movement 35 the drive diaphragm 5 is elastically deformed.

On account of the rigid connection of the diaphragm mounting section 33 to the rod mounting section 34, the output rod 16 accompanies the drive movement 35 of the diaphragm mounting section 33, resulting directly in the output movement 17 which may be tapped at the output section 25.

The controlled fluidic pressurisation of the second working chamber 8 may be effected through a control channel 36 running at least partly in the wall of the actuator housing 3. The control channel 36 has a connection port 36a located on an outer surface of the actuator housing 3, starting from which it extends through the actuator housing 3, so as to lead finally into the second working chamber 8.

In the embodiment, the connection port 36a is located on the first actuator housing section 12, while the second working chamber 8 is formed in the second actuator housing section 13. The control channel 36 is here preferably so formed in the transition zone between the two actuator housing sections 12, 13, that it passes the two insert elements 14, 15 peripherally, and specifically radially between the insert elements 14, 15 and the wall of the actuator housing 3. Other channel guides of the control channel 36 are of course also possible.

Preferably the connection port 36a is located at an axially oriented outer end face 37 of the first actuator housing section 12.

Provided in the first working chamber 7 is a spring device 38 which rests axially between the drive diaphragm 5 and the first end wall 22. It is in the form of a compression spring which biases the drive diaphragm 5 constantly in the direction of the first end position. In the unpressurised state of the second working chamber 8, the drive diaphragm 5 is therefore held by the spring device 38 in a basic position corresponding to the first end position.

In operation of the diaphragm actuator 1, the controlled fluidic pressurisation of the second working chamber 8 through the control channel 36 is such that a fluidic force opposite to the spring force of the spring device 38 is generated. This fluidic force acts on the drive diaphragm 5, and its diaphragm mounting section 33 is deflected towards the second end position, overcoming the spring force of the spring device 38. In this way, any desired axial position of the output rod 16 may be set.

The diaphragm actuator 1 of the embodiment also has a further control channel 42 passing through the actuator housing 3 and which, via a connection port 42a, similarly emerges at one end at the outside of the actuator housing 3 and at the other end leads into the first working chamber 7, in a manner not shown further. It is therefore possible to dispense with the spring device 38 and also to make a controlled fluidic pressurisation in respect of the first working chamber 7, so that the diaphragm actuator 1 may be used as a double-acting fluid-controlled diaphragm actuator 1. It is also possible to place the spring device 38 in the second working chamber 8, instead of in the first working chamber 7, so that the drive diaphragm 5 is constantly biased towards the second end position, wherein in this case the further control channel 42 is used, in order to drive the drive diaphragm 5, and consequently also the output rod 16, through controlled fluidic pressurisation of the first working chamber 7.

The fixing of the drive diaphragm 5 to the output rod 16 described above is realised by means of two annular retaining elements, referred to below as the first retaining element 43 and the second retaining element 44. The diaphragm mounting section 33 is clamped between the two retaining elements 43, 44 with elastic deformation, wherein each retaining element 43, 44 for its part is fixed to the output rod 16 solely by means a welded connection 45, 46 individually assigned to it. The welded connection provided for fixing of the first retaining element 43 is also described below as the first welded connection 45, and the welded connection fixing the second retaining element 44 is also described as the second welded connection 46. Each retaining element 43, 44 has a central through hole 47. The two retaining elements 43, 44 are so pushed on to the output rod 16 passing through the drive diaphragm 5, by their central through hole 47, that they flank the diaphragm mounting section 33 on axially opposite sides.

Each retaining element 43, 44 has an annular front axial end face 48 which faces the diaphragm mounting section 33. The diaphragm mounting section 33 has an annular first axial end face 52 facing the first retaining element 43, which the first retaining element 43 abuts with its front axial end face 48. The diaphragm mounting section 33 also has an annular second axial end face 53 facing the second retaining element 44 and which the second retaining element 44 abuts with its front axial end face 48.

The two retaining elements 43, 44 are welded on to the rod mounting section 34 at an axial distance from one another which is less than the thickness of the diaphragm mounting section 33, clamped between the two front axial end faces 48 of the retaining elements 43, 44, in its unclamped original state. In other words, the clamped diaphragm mounting section 33 made of material with rubber-elastic properties is axially thicker before clamping between the two retaining elements 43, 44 than in the clamped state. This results in a clamping force which firmly holds the diaphragm mounting section 33 from axially opposite sides and which not only holds the diaphragm mounting section 33 firmly but also, in particular simultaneously, provides a fluid-tight seal with respect to the two retaining elements 43, 44.

The two welded connections 45, 46 are preferably in each case an energy beam welded connection, which may be realised for example by electron beam welding or plasma welding, but is preferably a laser beam welded connection.

Each welded connection 45, 46 is formed expediently by a self-contained annular weld seam 54, concentric to the output rod 16. It is applied in such a way that both the material of the output rod 16 and also the material of the assigned retaining element 43, 44 are briefly melted and combined with material bonding. This results in firm cohesion, with the weld seam 54 at the same time providing a fluid-tight seal between the joined components.

After creation of the welded connections 45, 46, the output rod 16, the drive diaphragm 5 and the two retaining elements 43, 44 represent an operating unit 10 of the diaphragm actuator 1, which may be handled as a single unit and, in production of the diaphragm actuator 1, may be installed as a unit in the actuator housing 3 of the diaphragm actuator 1.

The two retaining elements 43, 44 are expediently substantially annular-disc-shaped. Accordingly they have a relative low overall height in the axial direction. Preferably they are so designed that their annular body 55 extending around the respective central through hole 47 has a U-shaped cross-section, and rests on the output rod 16 in such a way that the U-opening of the U-shaped cross-section faces axially away from the clamped diaphragm mounting section 33.

Specifically, in the embodiment, each of the retaining elements 43, 44 has a flat annular section 58, extending around the centre of the central through hole 47 and lying in a plane at right-angles to the longitudinal axis of the respective retaining element 43, 44. Integrally adjoining this annular section in each case are an inner sleeve-shaped section 56 on the radial inside and an outer sleeve-shaped section 57 on the radial outside. The two sleeve-shaped sections 56, 57 extend axially from the annular section 58 to the same side, namely away from the drive diaphragm 5. The transition zones between the annular section 58 and the two sleeve-shaped sections 56, 57 are preferably rounded, at least on the side facing the drive diaphragm 5.

Figure 2:
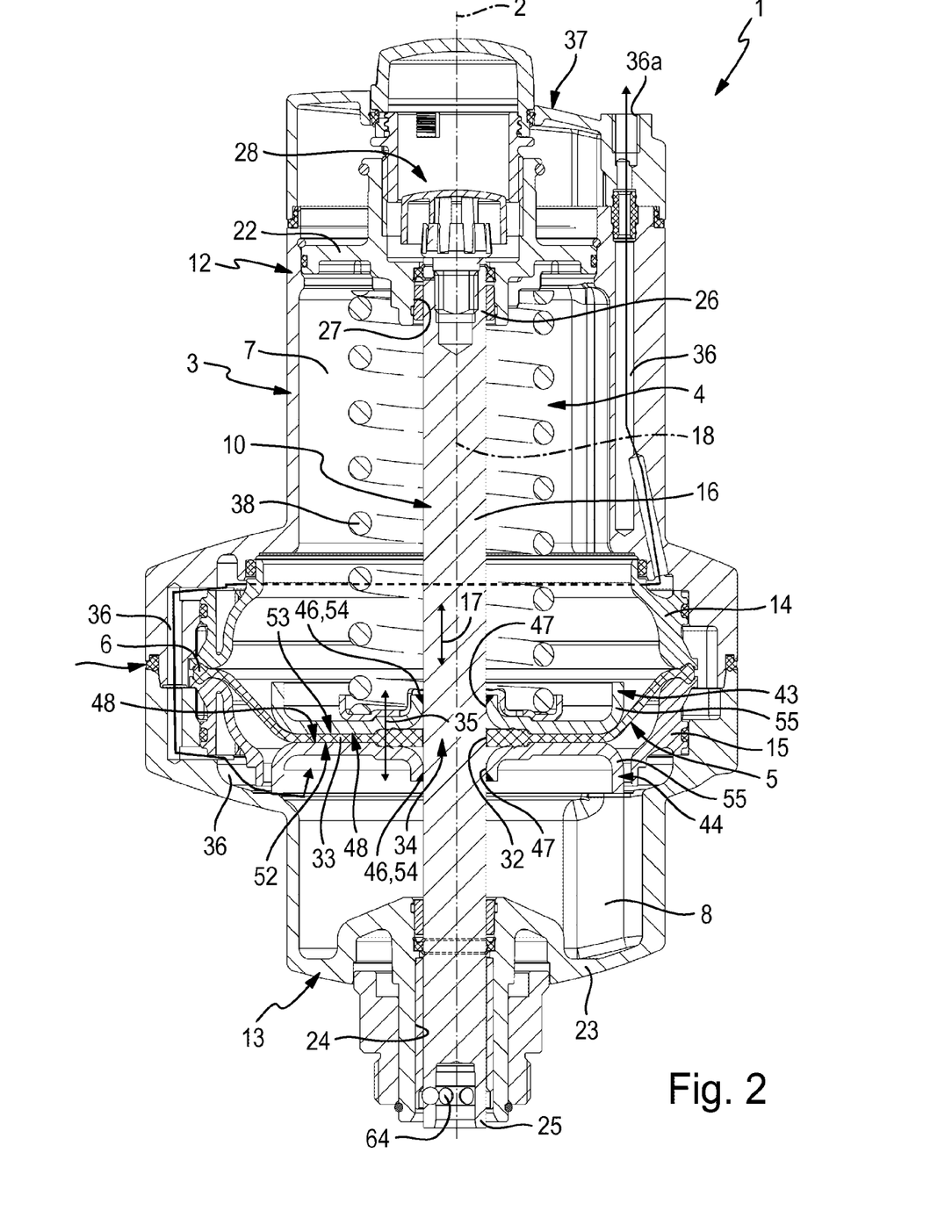
Figure 7:
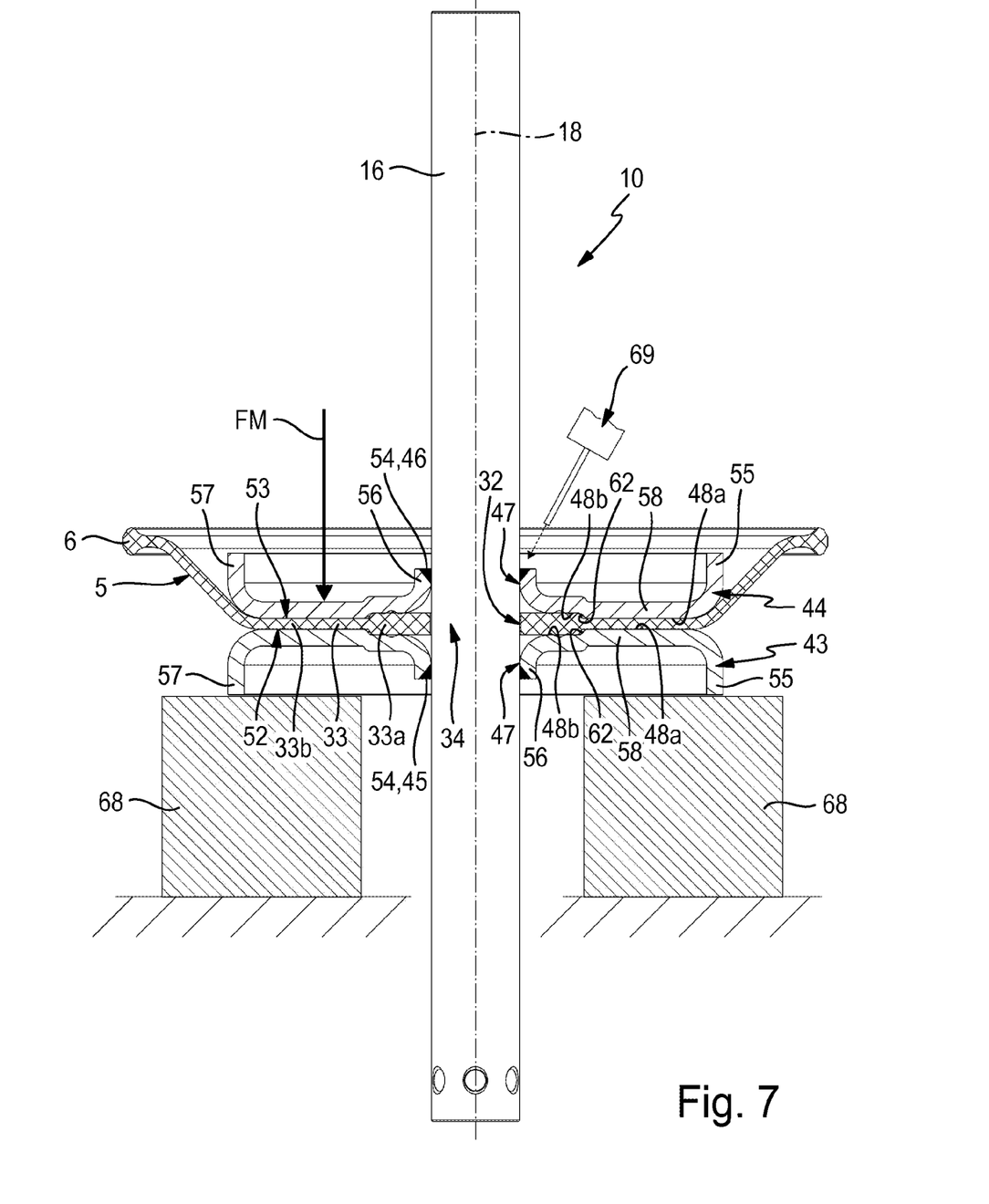

Viewed in the cross-section according to FIGS. 2 and 7, i.e. with a section plane parallel to the longitudinal axis 18 of the output rod 16, the two U-legs of the U-shaped cross-section of the annular body 55 result from the two sleeve-shaped sections 56, 57. The front axial end face 48 is located on the side of the annular section 58 facing away from the two sleeve-shaped sections 56, 57.

The diameter of the central through hole 47 of the retaining elements 43, 44 is expediently only slightly larger than the outside diameter of the output rod 16 in the area of the rod mounting section 34. Consequently, in the course of fitting, the two retaining elements 43, 44 may easily be pushed onto the output rod 16.

If the central through hole 47 is framed by an inner sleeve-shaped section 56 of the relevant retaining element 43, 44, then the proneness to tilting of the retaining element 43, 44 pushed onto the output rod 16 and not yet firmly welded is especially low, so that it may pushed right up to the second retaining element 44 without difficulty and without tilting.

The welded connections 45, 46 are expediently made in the area of the end faces of the retaining elements 43, 44 which face away from the clamped diaphragm mounting section 33. In the case of the especially advantageously designed retaining elements 43, 44 of the embodiment, each of the welded connections 45, 46 is made in the area of the end face of the inner sleeve-shaped section 56 and the radial outer periphery of the output rod 16.

Both the output rod 16 and also the two annular retaining elements 43, 44 are expediently metal parts.

Each of the retaining elements 43, 44 has expediently on its front axial end face 48 on the annular section 58 a concentric step 62, by which the axial end face 48 is divided into an annular outer end face section 48a, at a greater radial distance from the central through hole 47, and an annular inner end face section 48b, axially recessed relative to the former, wherein the latter lies concentrically between the central through hole 47 and the outer end face section 48a.

In adaptation in this respect, the diaphragm mounting section 33 is in particular so designed that it has an inner part mounting section 33a encompassing the central through hole 32, and an outer part mounting section 33b adjoining the former on the radial outside and concentrically encompassing the inner part mounting section 33a, with the outer part mounting section 33b being axially thinner than the inner part mounting section 33a. The inner part mounting section 33a projects axially on either side beyond the outer part mounting section 33b and dips into a recess, concentric to the central through hole 47, at the front axial end face 48 of the adjacent retaining element 43, 44 which is defined by the recessed inner end face section 48b and the step 62.

In this way the diaphragm mounting section 33 engages positively in the two retaining elements 43, 44, so that it is also then securely clamped when the drive diaphragm 5 is subjected to a high fluidic force and a radial tensile stress.

The two retaining elements 43, 44 act in each case on the outer part mounting section 33b with their outer end face section 48a and on the inner part mounting section 33a with their inner end face section 48b.

At the rear of the annular section 58 opposite the front axial end face 48, the retaining elements 43, 44 may be concentrically stepped, corresponding to the step 62. This may be achieved very easily by suitable bending and/or press forming during production of the retaining elements 43, 44.

The retaining elements 43, 44 may also be stepped concentrically on the disc-shaped annular section 58 several times, in areas which are radially spaced apart. This makes possible in particular a design in which the inner part mounting section 33a does not extend as far as the radial edge zone of the annular section 58, but terminates before that point and joins an annular outer surface section towards the radial outside and which, like the inner part mounting section 33a, is axially recessed. That section of the drive diaphragm 5 which extends between the two recessed outer annular surface sections of the two retaining elements 43, 44 then has an axial thickness which is less than the distance between the two outer annular surface sections of the annular section 58, thereby creating an air gap, open to the radial outside, between the drive diaphragm 5 and the two outer annular surface sections of the retaining elements 43, 44, which promotes the mobility of the drive diaphragm 5 and prolongs its life.

Figure 3:
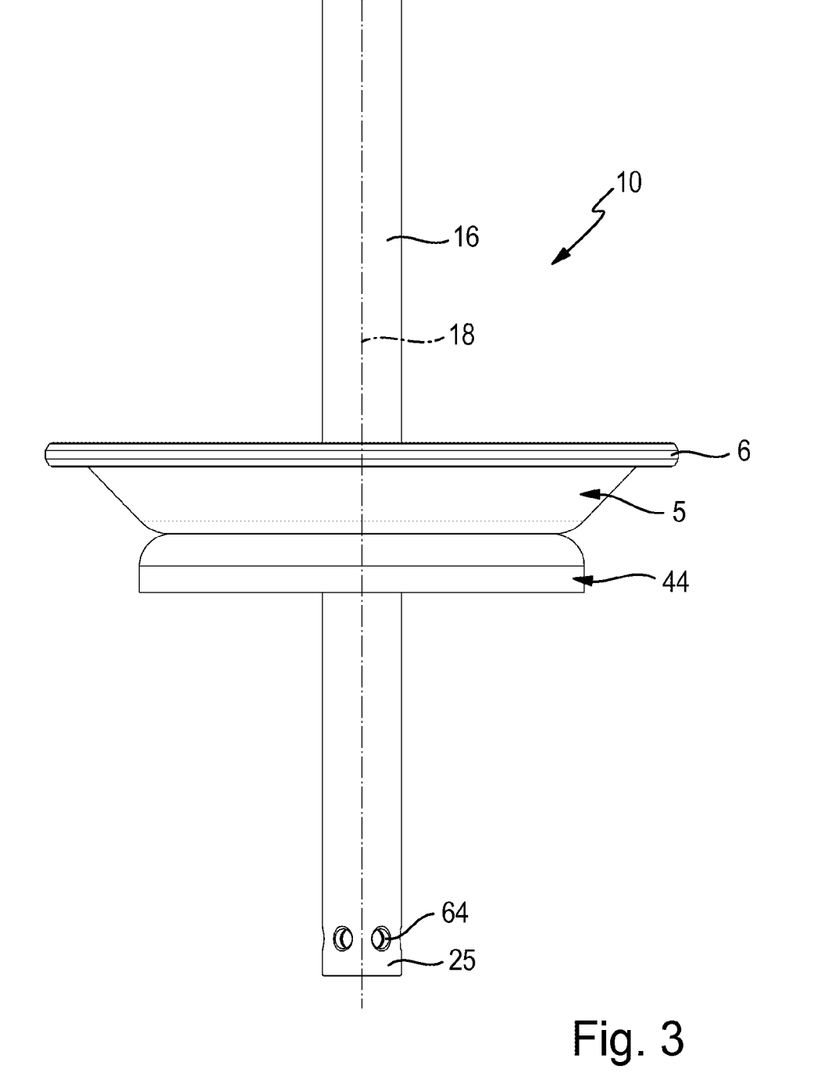

With the aid of FIGS. 4 to 7, a preferred method of producing the operating unit 10, depicted isolated in FIG. 3, will be described.

Figure 4:
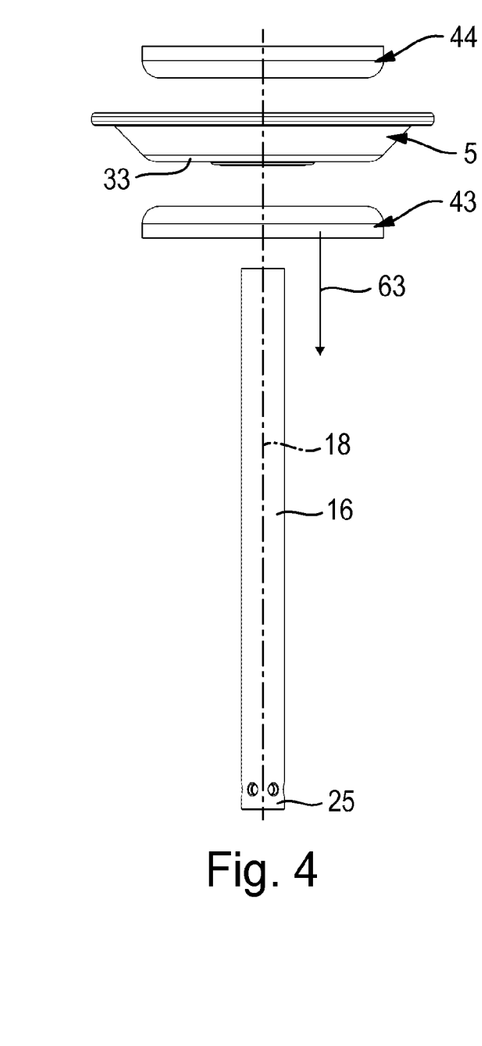

The process begins according to FIG. 4 with provision of the output rod 16, the drive diaphragm 5 and the two retaining elements 43, 44. These components are produced independently of one another.

Figure 5:
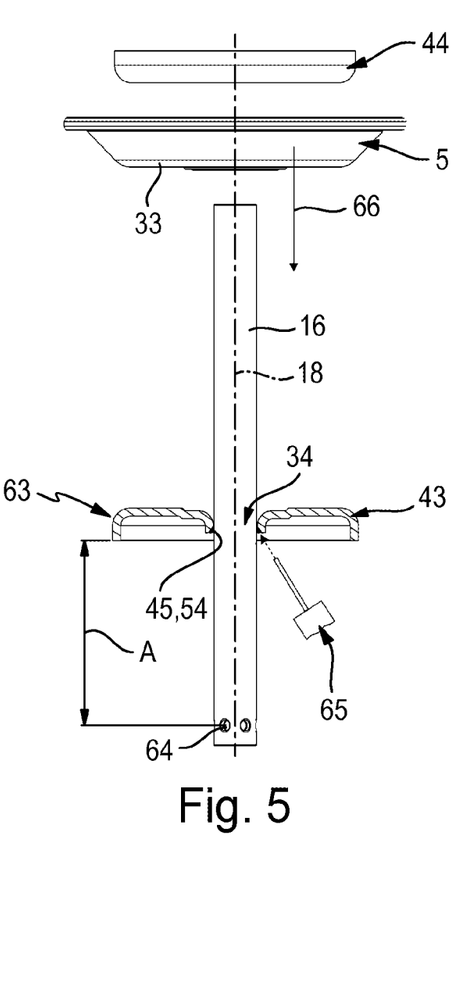

Then, as shown by arrow 63, the first retaining element 43 is pushed by its central through hole 47 onto the output rod 16, until it reaches the target position 63 on the rod mounting section 34 as shown in FIG. 5. The target position 63 is determined for example with the aid of a distance A from a mechanical interface device 64 formed on the output section 25, which serves for the attachment of one of the external components to be operated.

Next, by means of a welding apparatus 65, the first welded connection 45 or the weld seam 54 forming this first welded connection 45 is applied, so that the first retaining element 43 is fixed to the output rod 16 by welding.

Figure 6:
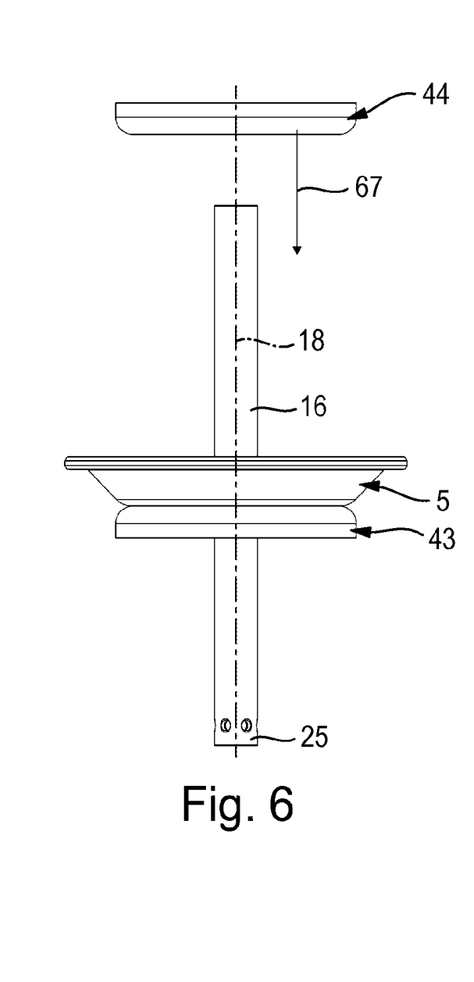

Next, in accordance with arrow 66 in FIG. 5, the drive diaphragm 5 is pushed axially onto the output rod 16 by its central through hole 32 until it is in contact, by its diaphragm mounting section 33, with the already firmly welded first retaining element 43. This interim state is illustrated in FIG. 6.

This is followed, as shown by arrow 67, by pushing the second retaining element 44 on to the output rod 16 until the second retaining element 44 fits up against the diaphragm mounting section 33 from the side opposite the first retaining element 43. This interim state is illustrated in FIG. 7.

At this point it should be noted that the drive diaphragm 5 and the second retaining element 44 may also be pushed on to the output rod 16 in a common push-on process.

In the interim state now reached, the drive diaphragm 5 is incorporated, in a coaxial arrangement, axially between the two retaining elements 43, 44. The next process step consists of an axial bracing of the two retaining elements 43, 44 by the imposition of an external mounting force FM, so that the diaphragm mounting section 33 located between the two retaining elements 43, 44 is elastically compressed and is clamped with a certain clamping force between the two retaining elements 43, 44.

The imposition of the mounting force FM occurs in particular because the already welded-on first retaining element 43 is supported axially by an external support device 68 from the side opposite the second retaining element 44 and at the same time a mounting force FM is introduced into the not yet firmly welded second retaining element 44, acting in the direction of the supported first retaining element 43, by means of a force application device, not shown in detail, in accordance with the plotted arrow.

By means of a suitable force measuring device, the currently imposed mounting force FM may be monitored or set, so that the diaphragm mounting section 33 is clamped with a defined, predetermined clamping force between the two retaining elements.

The desired clamping force may alternatively also be set by providing that the two retaining elements 43, 44 are set at a predetermined distance from one another by application of a suitably high mounting force FM, in which it has been determined in advance by empirical measurement that the desired clamping force will result from this application.

In a further process step following the firm clamping, the second welded connection 46 or a weld seam 54 forming the second welded connection 46 is applied by means of a welding apparatus 69, in order to weld the second retaining element 44, axially immovably, to the output rod 16. The welding apparatus 69 used here need not however be the same as the welding apparatus 65 used for welding-on the first retaining element 43.

Figure 1:
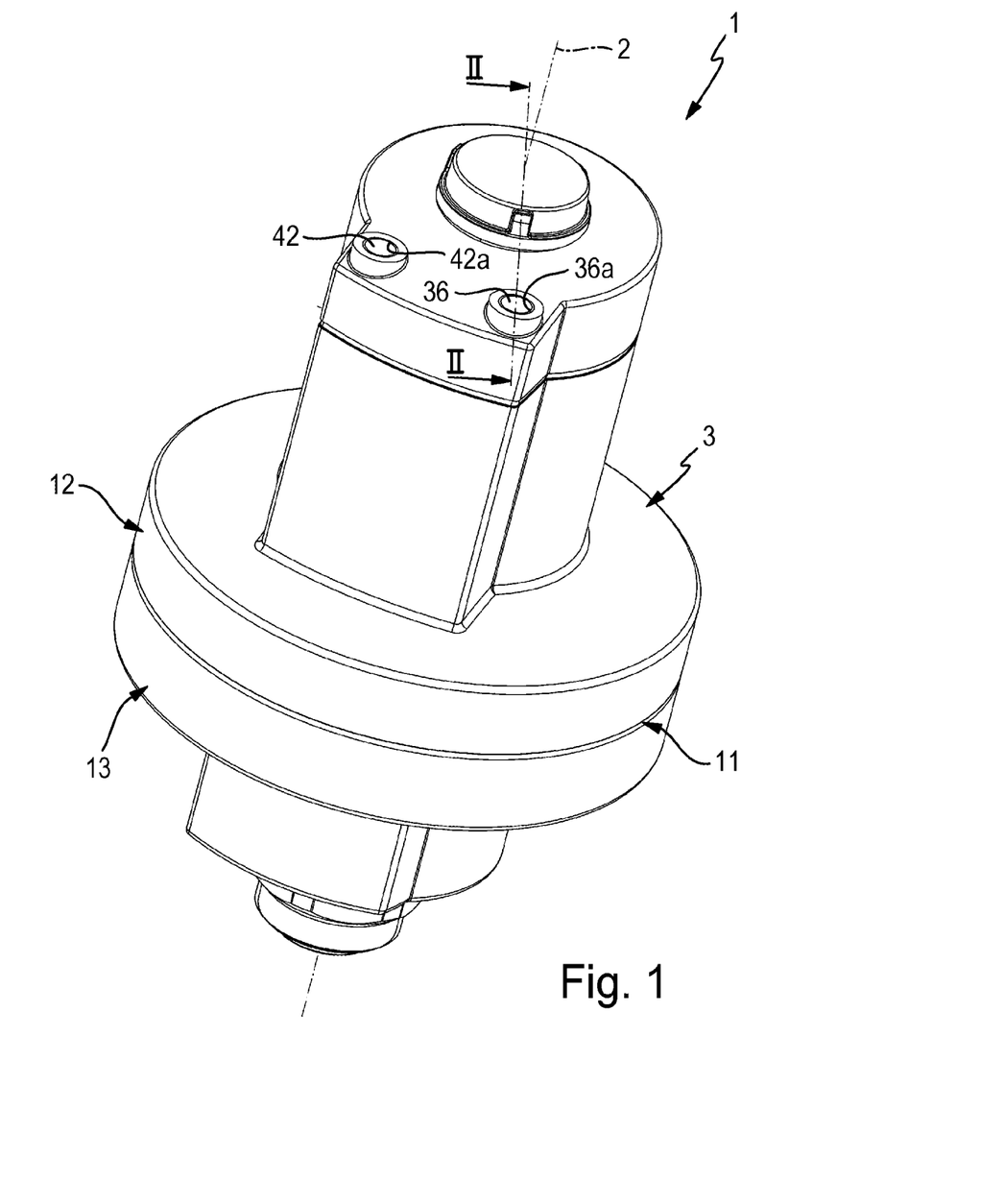
FIG. 1 an isometric view of a preferred embodiment of a fluid-operated diaphragm actuator according to the invention, which is equipped with an operating unit according to the invention, and has been produced expediently using the method according to the invention FIG. 2 a longitudinal section through the diaphragm actuator of FIG. 1 according to section plane II-II of FIG. 1

After the two retaining elements 43, 44 are now welded to the output rod 16, the mounting force FM is removed and the operating unit 10 thus produced may be passed on for further use in the assembly of a fluid-operated diaphragm actuator 1 of the type illustrated by way of example in FIGS. 1 and 2.

The invention claimed is:

1. An operating unit of a fluid-operated diaphragm actuator, comprising an elastically deformable drive diaphragm having a central through hole, two annular retaining elements flanking the drive diaphragm on axially opposite sides, and an output rod passing through the drive diaphragm and through the retaining elements, wherein a central diaphragm mounting section of the drive diaphragm is clamped between the two retaining elements fixed to the output rod, and wherein the two retaining elements are attached to the output rod by means of respective welded connections, independently of one another and at an axial distance from one another for generating a predetermined clamping force relative to the drive diaphragm.

2. The operating unit according to claim 1, wherein the axial distance between the two retaining elements in the area of the diaphragm mounting section is less than the axial thickness of the clamped diaphragm mounting section in the unclamped initial state of the diaphragm mounting section.

3. The operating unit according to claim 1, wherein each welded connection is formed by an annular weld seam, concentric to the output rod.

4. The operating unit according to claim 1, wherein each of the two welded connections is a laser welded connection.

5. The operating unit according to claim 1, wherein the welded connections are made in the area of the end faces of the retaining elements facing axially away from the clamped diaphragm mounting section.

6. The operating unit according to claim 1, wherein the two retaining elements are annular-disc-shaped.

7. The operating unit according to claim 6, wherein the annular body of the annular-disc-shaped retaining elements has a U-shaped cross-section, wherein the opening of the U-shaped cross-section faces away from the clamped diaphragm mounting section.

8. The operating unit according to claim 7, wherein the welded connections are made in each case at the end face between an inner sleeve-shaped section of the retaining element and the output rod, wherein the inner sleeve-shaped section of the retaining element forms an inner U-leg of the cross-section of the annular body.

9. The operating unit according to claim 1, wherein the central diaphragm mounting section has an annular inner part mounting section encompassing the central through hole of the drive diaphragm and an annular outer part mounting section, concentrically encompassing the inner part mounting section and having a lesser thickness than the annular inner part mounting section, wherein front axial end faces of the annular retaining elements which act on the diaphragm mounting section have in each case a concentric step, which is located between an annular outer end face section acting on the outer part mounting section, and an annular inner end face section, axially recessed with regard to the former and acting on the inner part mounting section.

10. The operating unit according to claim 1, wherein the output rod and the annular retaining elements are made of metal.

11. The operating unit according to claim 10, wherein the output rod and the annular retaining elements are made of steel.

12. A method of producing an operating unit of a fluid-operated diaphragm actuator, comprising an elastically deformable drive diaphragm having a central through hole, two annular retaining elements flanking the drive diaphragm on axially opposite sides, and an output rod passing through the drive diaphragm and through the retaining elements, wherein a central diaphragm mounting section of the drive diaphragm is clamped between the two retaining elements fixed to the output rod and wherein the two retaining elements, for their fixing on the output rod, are welded independently of one another to the output rod passing through them, wherein the two retaining elements, in the state in which at least one retaining element is not yet welded to the output rod, are braced against one another axially by the imposition of an external mounting force in such a way that the central diaphragm mounting section of the drive diaphragm previously incorporated between the two retaining elements is clamped axially between the retaining elements by a predetermined clamping force, whereupon the at least one retaining element not so far welded-on is welded to the output rod while maintaining the external mounting force.

13. The method according to claim 12, wherein one of the retaining elements is welded to the output rod before imposition of the external mounting force, and only the second retaining element is welded to the output rod with the external mounting force applied.

14. A fluid-operated diaphragm actuator, comprising an actuator housing which bounds a housing interior in which is mounted an elastically deformable drive diaphragm separating two axially adjacent working chambers from one another with fluid-tightness and coupled to an output rod for driving purposes, and which is axially deflectable by means of fluidic pressurisation of at least one of the working chambers in order to generate an output movement of the output rod, wherein the drive diaphragm is fixed to the output rod by being clamped with a central diaphragm mounting section between two annular retaining elements resting on the output rod and flanking the drive diaphragm on axially opposite sides, wherein the drive diaphragm together with the two retaining elements and the output rod are combined to form an operating unit, wherein the drive diaphragm has a central through hole and the output rod passes through the central through hole of the drive diaphragm and through the retaining elements, wherein both retaining elements are attached to the output rod by means of a welded connection independently of one another and at an axial distance from one another for generating a predetermined clamping force relative to the drive diaphragm.

15. A fluid-operated diaphragm actuator, comprising an actuator housing which bounds a housing interior in which is mounted an elastically deformable drive diaphragm separating two axially adjacent working chambers from one another with fluid-tightness and coupled to an output rod for driving purposes, and which is axially deflectable by means of fluidic pressurisation of at least one of the working chambers in order to generate an output movement of the output rod, wherein the drive diaphragm is fixed to the output rod by being clamped with a central diaphragm mounting section between two annular retaining elements resting on the output rod and flanking the drive diaphragm on axially opposite sides, wherein the drive diaphragm together with the two retaining elements and the output rod are combined to form an operating unit, wherein the two retaining elements, for their fixing on the output rod, are welded independently of one another to the output rod passing through them, wherein upon production of the operating unit the two retaining elements, in the state in which at least one retaining element is not yet welded to the output rod, are braced against one another axially by the imposition of an external mounting force in such a way that the central diaphragm mounting section of the drive diaphragm previously incorporated between the two retaining elements is clamped axially between the retaining elements by a predetermined clamping force, whereupon the at least one retaining element not yet welded to the output rod is now also welded to the output rod while maintaining the external mounting force.

* * * * *